(12) United States Patent
Skaug

(10) Patent No.: US 7,733,593 B2
(45) Date of Patent: Jun. 8, 2010

(54) WRITE CHANNEL EQUALIZATION LEVEL CONTROL IN MAGNETIC RECORDING DEVICE

(75) Inventor: Steffen Skaug, Oslo (NO)

(73) Assignee: Tandberg Storage ASA, Oslo (NO)

( * ) Notice: Subject to any disclaimer, the term of this patent is extended or adjusted under 35 U.S.C. 154(b) by 658 days.

(21) Appl. No.: 11/673,210

(22) Filed: Feb. 9, 2007

(65) Prior Publication Data

US 2008/0192375 A1 Aug. 14, 2008

(51) Int. Cl.
*G11B 5/035* (2006.01)

(52) U.S. Cl. .................. 360/65; G9B/5.032; G9B/20.01

(58) Field of Classification Search .................. None
See application file for complete search history.

(56) References Cited

U.S. PATENT DOCUMENTS

| 4,479,152 | A | 10/1984 | Chi |
| 5,255,130 | A | 10/1993 | Buchan et al. |
| 5,339,202 | A | 8/1994 | Heinz et al. |
| 5,872,665 | A | 2/1999 | Millican et al. |
| 2002/0041245 | A1 * | 4/2002 | Brownlow et al. .......... 341/145 |

* cited by examiner

*Primary Examiner*—Daniell L Negrón
(74) *Attorney, Agent, or Firm*—Schiff Hardin LLP

(57) ABSTRACT

A magnetic recording device write channel includes a write equalization encoder for generating a write equalization level signal and a digital to analog converter for converting the write data signal to analog signals for recording. The write equalization level signal from the write equalization encoding device controls an impedance value at an output of said digital-to-analog converter. The output of the digital-to-analog converter is connected to an input of the data transmission line which transmits the write data signal to a write head of the magnetic recording device. Variation in the output impedance of the digital-to-analog converter by comparison to the input impedance of the transmission line controls the level of the equalization transmitted to the write head of the magnetic recording device.

7 Claims, 2 Drawing Sheets

WRITE CHANNEL EQUALIZATION LEVEL CONTROL IN MAGNETIC RECORDING DEVICE

BACKGROUND OF THE INVENTION

1. Field of the Invention

The present application relates generally to the field of write channel equalization in a magnetic recording device and in particular to a write equalization level control in a tape drive.

2. Description of the Related Art

Magnetic recording devices such as magnetic tape drives are used for recording computer data for storage and retrieval. Various techniques have been developed over the years to improve the characteristics of data reading and writing on magnetic media. One such development is write equalization recording.

In U.S. Pat. No. 5,255,130 is disclosed an adjustable write equalization for tape drives wherein a circuit and method are provided for adjusting write equalization pulses in a tape drive to achieve a desired suppression in the read signal.

U.S. Pat. No. 5,872,665 discloses a programmable write equalization for magnetic data recording wherein a circuit and a method for generating a write compensated write data signal for magnetic recording is provided. Extra write pulses are generated to adjust the pulse width and pulse spacing.

U.S. Pat. No. 5,339,202 discloses an adjustable write-equalized recording circuit for recording data on magnetic tape wherein the amplitude of write-equalisation pulse data waveform is varied by a preset amount or by a sensed amount.

In general, the effect of write equalization pulses can be controlled either by controlling the amplitude of the pulses or by controlling the width of the pulses.

Write equalization is generally used in tape drives in order to put some of the channel equalization on the write side, thereby reducing the amount required on the read side and improving the channel signal-to-noise ratio. Ideally, a write equalization circuit is a digital linear filter. However, the non-linear nature of magnetic recording processes make it desirable to control and adjust the pulses in order to achieve as linear a filter as is possible, given the magnetic non-linearities. Achieving a linear filter response is particularly important for partial response maximum likelihood (PRML) channels, requiring linear superposition of read pulses.

The high frequency nature of the write equalization generally leads to designing the media from the write driver circuit to the write head as a controlled impedance transmission line.

SUMMARY OF THE INVENTION

The present invention relates generally to magnetic recording of data on a magnetic media where the data is provided to a write head by a write channel, the write channel including equalization of the data signal prior to being written to the media. In the write channel, the invention provides a circuit and method for controlling the level of write equalization pulses by establishing different impedances at an interface to the transmission line for the write equalization content and the data content, wherein the impedances for the write equalization content and the data content are established independently. In particular, the write channel includes a write equalization apparatus that inserts the write equalization pulses into the data stream prior to forwarding the write pulses to the write head, the write equalization pulses being provided, in one embodiment, to a digital to analog converter that provides a different output impedance for the write equalization pulses than for the data pulses. The digital to analog converter output is connected to the transmission line that provides the pulses to the write head; the different impedances providing an impedance mismatch to the transmission line for at least one of the two pulse types.

DETAILED DESCRIPTION OF THE PREFERRED EMBODIMENTS

Figure 1:
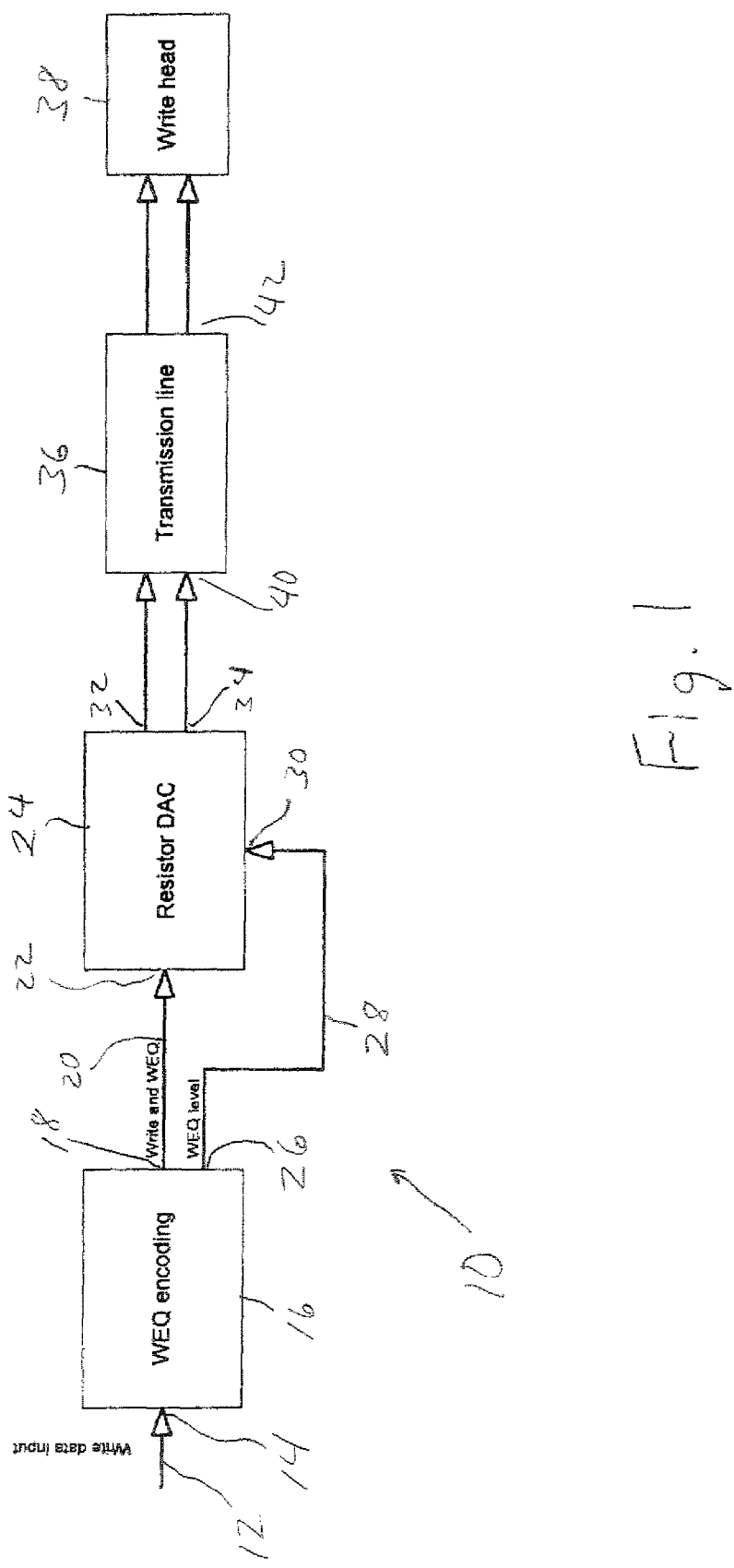
FIG. 1 is a functional block diagram of a write equalization level control system according to the principles of the present invention.

With reference to FIG. 1, a write channel 10 of a magnetic recording system is shown. The write channel may be the write channel of any of a variety of recording devices and in a preferred embodiment is a write channel of a magnetic tape recording device. One such device is a tape recording and playback device for recording data of a computer system, such as for data backup. In one embodiment, the tape recording and playback device is in a so-called autoloader apparatus for recording onto and playing back from multiple tape cartridges in an automated fashion.

The write channel 10 receives a stream of write data 12 for example from a computer system, although other sources of the data are of course possible. The write data 12 of the present example is in the form of data pulses. In a typical write channel, the data stream is formatted for recording by a formatter chip (not shown) that provides the data to the write channel, although this is not necessary in every case. This data stream 12 is provided to an input 14 of a write equalization encoder 16, which operates to insert write equalization pulses into the write data stream and provide the combined write data and write equalization pulses at a first output 18. The write equalization encoder 16 ideally provides a digital linear filter response. The write data stream with the write equalization pulses is transmitted via a connection 20 to an input 22 of a resistor digital-to-analog converter 24.

The write equalization encoder 16 also has a second output 26 from which it produces a write equalization level signal. The write equalization level signal is provided via a connection 28 to a second input or control input 30 of the resistor digital-to-analog converter 24. The resistor digital-to-analog converter 24 includes outputs 32 and 34. The signals provided on the outputs 32 and 34 are differential signals, meaning that they carry the same information but have opposite signal polarity. The output impedance of the converter is changed over the time axis depending on whether the content being output is a write equalization signal or a data signal.

Due to the high frequency of the data pulses and write equalization signals, a connection 36 from the resistor digital-to-analog converter 24 to a write head 38 is modeled as a controlled impedance transmission line. The connection, also referred to as the transmission line 36, transmits the signals to the write head 38. The write head 38 provides the magnetic write signals to a magnetic recordable medium such as a magnetic tape so that the equalized data is recorded to the magnetic medium.

The controlled impedance transmission line 36 is typically terminated well at a source side 40 where the resistor digital-to-analog converter is connected and poorly terminated at the receiver side 42 where the transmission line 36 is connected to the write head 38. In particular, the input impedance at the source side 40 where the transmission line 36 is connected to the resistor digital-to-analog converter 24 is matched to the output impedance at 32 and 34 of the resistor digital-to-analog converter 24. On the other hand, the output 42 of the transmission line 36 at the write head 38 typically has an impedance mismatch between the transmission line 36 and the write head 38.

According to the present invention, however, the amount of impedance mismatch between the resistor digital-to-analog converter 24 and the transmission line 36 is set or controlled depending on the data content being output by the converter 24. The data pulses are provided at the outputs at one output impedance and the write equalization pulses are provided at the outputs at a different output impedance. Said another way, the interface between the digital-to-analog converter 24 and the transmission line 36 has a predetermined or controlled amount of mismatch that is different for write equalization signals than it is for the data signals. Specifically, the write equalization level control signal on the connection 28 to the resistor digital-to-analog converter 24 causes the levels of the write equalization pulses provided to the write head to differ from the levels of the data pulses as a result of differences in the impedance levels for the output of the data pulses compared to the output of the write equalization pulses.

The preferred embodiment provides that the digital-to-analog converter is controlled by seven bits. Two different seven bit settings are used in the operation of the converter, one seven bit setting for the write equalization content and the other for the data content. This different control for the different pulse types causes the converter to change the impedance at the output for the different signals.

According to the present invention, the amount of mismatch in the impedance is set to a predetermined level or is controlled to a level, and is introduced in the write equalization pulses to control the level of the write equalization pulses written to the magnetic recordable medium so that they are different than the level of the write data pulses. It is also contemplated to set or control the amount of mismatch in the impedance in the write data pattern, either alone or in combination with setting or controlling the output impedance of the write equalization pulses. The level of the write equalization pulses are controlled by comparison to the level of the write data pattern. The variation in the output impedances of the digital-to-analog converter by comparison to the input impedance of the transmission line controls the level of the equalization transmitted to the write head of the magnetic recording device.

The impedance mismatch for the outputs of the converter to the transmission line may be set in advance by design, or may be established by some other means. Either the output of the data signals or the output of the write equalization pulses may be mismatched in impedance to the transmission line, or both output signals may be mismatched in impedance, although by different amounts. The result is that the levels of the signals from the two outputs are written at different levels to the magnetic media. This difference in levels can mean that the equalization pulses are lower than the data content or that they are higher than the data content.

The impedance mismatch is easily and inexpensively achieved with little additional outlay. The write equalization signals can be generated in a different circuit portion than the circuit portion for generation of the data content signals and these different circuit portions may have different output impedances. Other ways of providing the difference in impedance are also encompassed within this invention. The impedance of the outputs of the two signals is preferably independent of one another.

Examples of one way in which write equalization pulses (WEQ pulses) can be included in the write channel signal are set forth below.

Figure 2:
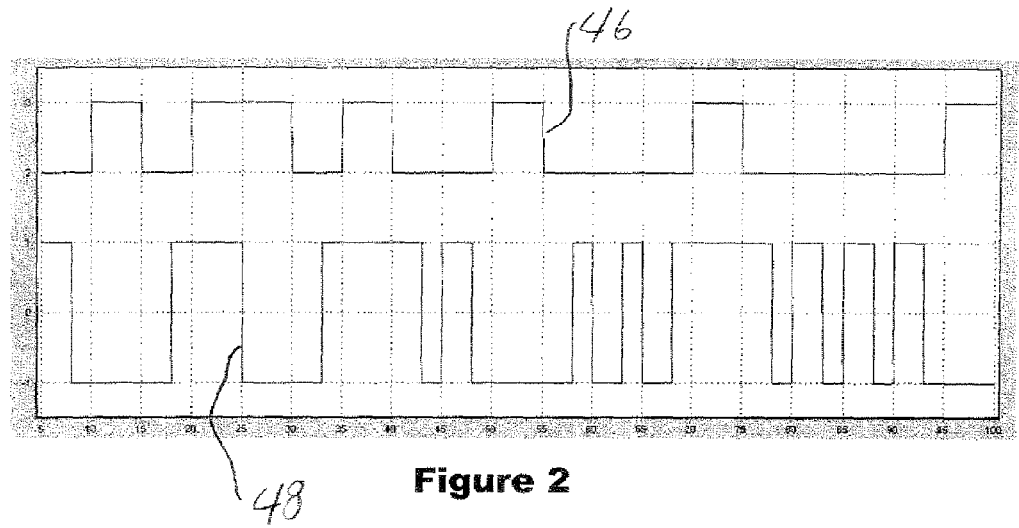
FIG. 2 is a signal diagram showing in an upper graph an example of a data signal at an input of a write channel and in the lower graph an example of the signal with write equalization pulses added into the signal.

FIG. 2 shows a signal 46, the upper signal in the drawing, that is composed of a stream of pulses, this pulse stream being provided to the write channel of a magnetic recording system for writing on a magnetic recordable medium. The data is binary, having a high signal level representing a "1" and a low signal level representing a "0". The numbers to the left of the graph are representative of the unit change in the level and do not represent an amplitude of the signal. The high signal when received at the write head of the write channel causes the current in the write head to change polarity, while the low signal results in no change in the polarity of the write head signal.

The lower signal 48 in FIG. 2 is a graph of the data pulses combined with write equalization pulses. The write equalization pulses have been added in with the same amplitude as the data portion of the signal. The resulting pulses are of different duration than the data signal alone, switch polarity above and below a zero line or base line, and include additional pulses that were not presenting the data pulse stream. The person of skill in this art would understand how to generate these write equalization pulses according to well known processes. The graphs of FIG. 2 is an example for purposes of illustration and may not represent an actual signal in the write channel.

Figure 3:
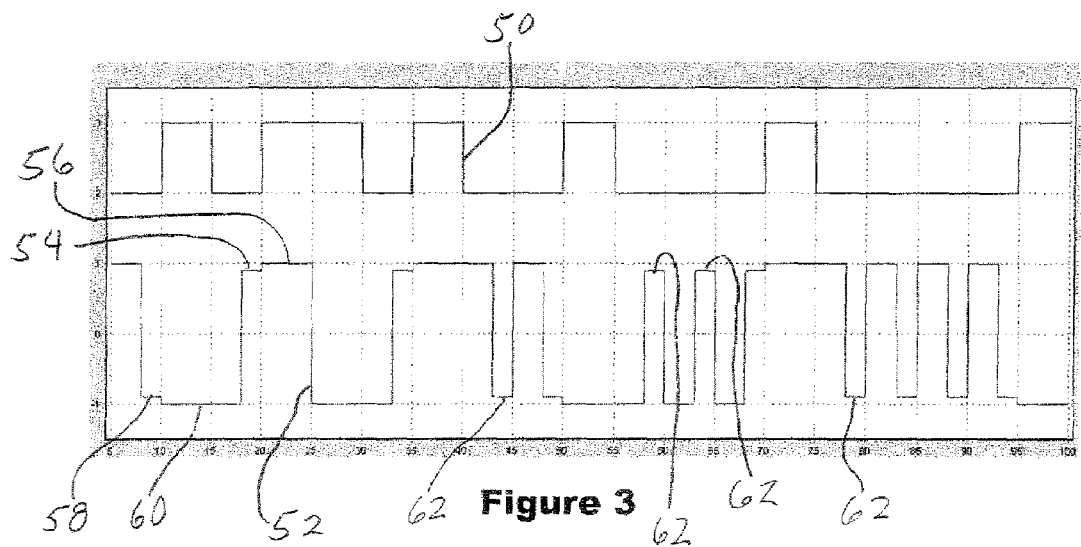
FIG. 3 is a signal diagram showing in an upper graph an example of a data signal at the input of the write channel and in the lower graph an example of the signal after addition of write equalization pulses according to the principles of the present invention.

Turning now to FIG. 3, the upper graph 50 is the data content or data pulse stream provided to the write channel of the magnetic recording device. Like the graph of FIG. 2, the signal has "0"s and "1"s, or high and low portions of the signal and include a unit change in level.

The lower graph of FIG. 3 shows a signal 52 that includes an added equalization signal according to the principles of the present invention. The impedance mismatch of the equalization pulses results in the equalization signals being of a different amplitude than the data part of the signal. In the illustrated example, the equalization pulses are at a lower amplitude, but they can also be provided at a higher amplitude. The difference in amplitude is achieved by the resistor digital-to-analog converter being set to a different, in this case higher, resistance for the write equalization pulses than for the data part of the signal. In the case of the write equalization pulses that are merged with the data pulses, the data pulses have been given a reduced amplitude. The signal 52 is lower in amplitude at 54 where the equalization signal is added in than at 56 where the data signal is present. Similarly, the equalization signal level at 58 is at a lower absolute amplitude than the data portion at 60. The equalization pulses at 62 are at a level lower than the data pulses.

Instead of the equalization pulses being at a lower amplitude than the data content, it is also envisioned that the write equalization pulses are at a higher amplitude. Further, the example of equalization pulses set forth above is but one example of how equalization pulses may be applied to a data signal, and other placement, duration, polarity, amplitude, and shape equalization pulses may be provided within the scope of this invention.

The write equalization pulses have a very high frequency, which is filtered out at the read side. Since the recording process is inherently non-linear, different amplitudes for the equalization pulses as compared to the write data content yields a better overall result in the write/read channel performance. The improved performance is evident in improved signal to noise ratios, improved error rates, and the like.

Thus, the amplitude of the pulses is controlled by impedance mismatching between the resistor digital-to-analog converter and the transmission line so that the level control of the write equalization is achieved easily and with little outlay.

Although other modifications and changes may be suggested by those skilled in the art, it is the intention of the inventors to embody within the patent warranted hereon all changes and modifications as reasonably and properly come within the scope of their contribution to the art.

I claim:

1. A method for controlling a write equalization level in a magnetic recording device, comprising the steps of:
   providing a write data signal;
   providing a write equalization encoding signal for combination with the write data signal;
   converting the write data signal and write equalization signal combination from a digital signal to an analog signal in a converter;
   transmitting said write equalization signal and said write data signal from said converter into a transmission line;
   forwarding said write equalization signal and said write data signal from the said transmission line to a write head; and
   providing an impedance mismatch between an output of said converter and an input of said transmission line for at least one of said write equalization signal and said write data signal, an impedance of said output of said converter for said write equalization signal differing from an impedance of said output of said converter for said write data signal to cause a difference in a level of the write equalization signal provided to said write head as compared to a level of the write data signal provided to said write head.

2. A method as claimed in claim 1, wherein said converter output for said write equalization signal has an impedance mismatch compared to said transmission line.

3. A method as claimed in claim 1, wherein said converter output for said write data signal has an impedance mismatch compared to said transmission line.

4. A method as claimed in claim 1, wherein said converter output for said write equalization signal has a first impedance mismatch compared to said transmission line; and
   said converter output for said write data signal has a second impedance mismatch compared to said transmission line, said first and second impedance mismatches being mutually different.

5. A system for controlling write equalization levels in a magnetic recording device, comprising:
   a write equalization encoding apparatus having an input receiving a write data signal and a first output producing a write data signal and write equalization signal combination and having a second output producing a write equalization level signal;
   a digital-to-analog converter connected to receive both said write data signal and write equalization signal combination from said write equalization encoding device and said write equalization level signal from said write equalization encoding device, said converter being operable to convert digital write and equalization signals to analog signals, said digital-to-analog converter having an output signal of a first impedance for said write data signal, said digital-to-analog converter having an output signal of a second impedance for said write equalization level signal;
   a transmission line connected to receive an output of said digital-to-analog converter, said transmission line having a predetermined impedance at said input; and
   a write head connected at an output of said transmission line for receiving said analog write and equalization signals.

6. A system as claimed in claim 5, wherein said digital-to-analog converter is a resistor digital-to-analog converter.

7. A system as claimed in claim 5, wherein said output signal of said first impedance is extant on an output lead of said converter at a different time than said output signal of said second impedance.

* * * * *